US006999463B2

(12) United States Patent
Christie et al.

(10) Patent No.: US 6,999,463 B2
(45) Date of Patent: *Feb. 14, 2006

(54) NUMBER PORTABILITY IN A COMMUNICATIONS SYSTEM

(75) Inventors: Joseph Michael Christie, deceased, late of San Bruno, CA (US); Joseph S. Christie, legal representative, Mt. Pleasant, PA (US); Jean M. Christie, legal representative, Mt. Pleasant, PA (US); Michael Joseph Gardner, Overland Park, KS (US); Albert Daniel DuRee, Independence, MO (US); William Lyle Wiley, Olathe, KS (US); Tracy Lee Nelson, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 181 days.

This patent is subject to a terminal disclaimer.

(21) Appl. No.: 10/635,664

(22) Filed: Aug. 6, 2003
(Under 37 CFR 1.47)

(65) Prior Publication Data

US 2004/0057427 A1 Mar. 25, 2004

Related U.S. Application Data

(63) Continuation of application No. 10/077,544, filed on Feb. 15, 2002, now Pat. No. 6,639,912, which is a continuation of application No. 09/272,131, filed on Mar. 19, 1999, now Pat. No. 6,795,440, which is a continuation of application No. 08/755,268, filed on Nov. 22, 1996, now Pat. No. 6,014,378.

(51) Int. Cl.
*H04L 12/28* (2006.01)
*H04L 12/56* (2006.01)

(52) U.S. Cl. ............... 370/410; 370/352; 370/356; 379/221.13

(58) Field of Classification Search ........ 370/351–356, 370/395.1, 396–399, 395.2, 395.21, 230, 370/235, 400, 401, 410, 524, 422, 426; 379/221.13–219, 379/220.01, 221.14
See application file for complete search history.

(56) References Cited

U.S. PATENT DOCUMENTS

| | | | |
|---|---|---|---|
| 4,720,850 A | 1/1988 | Oberlander et al. |
| 4,754,479 A | 6/1988 | Bicknell |
| 4,763,317 A | 8/1988 | Lehman et al. |
| 5,051,983 A | 9/1991 | Kammerl |
| 5,115,427 A | 5/1992 | Johnson, Jr. et al. |
| 5,204,857 A | 4/1993 | Obara |
| 5,278,889 A | 1/1994 | Papanicolaou et al. |
| 5,291,492 A | 3/1994 | Andrews et al. |
| 5,327,421 A | 7/1994 | Hiller et al. |
| 5,329,308 A | 7/1994 | Binns et al. |
| 5,339,318 A | 8/1994 | Tanaka et al. |
| 5,345,445 A | 9/1994 | Hiller et al. |
| 5,375,124 A | 12/1994 | D'Ambrogio et al. |

(Continued)

*Primary Examiner*—Ajit Patel

(57) ABSTRACT

A communication system is disclosed comprised of a signaling processor and an interworking system. The signaling processor receives a call setup message including a called number, processes the called number to transmit a query, receives a response message responsive to the query that includes number portability information for the called number, processes the number portability information to select an identifier for routing, and transmits a control message that identifies the identifier. The interworking system receives a user communication and the control message, converts the user communication into communications that include the identifier, and transfers the communications that include the identifier.

20 Claims, 13 Drawing Sheets

U.S. PATENT DOCUMENTS

| | | |
|---|---|---|
| 5,392,402 A | 2/1995 | Robrock, II |
| 5,422,882 A | 6/1995 | Hiller et al. |
| 5,428,609 A | 6/1995 | Eng et al. |
| 5,434,852 A * | 7/1995 | La Porta et al. ............ 370/385 |
| 5,452,297 A | 9/1995 | Hiller et al. |
| 5,461,669 A | 10/1995 | Vilain |
| 5,473,677 A | 12/1995 | D'Amato et al. |
| 5,473,679 A | 12/1995 | La Porta et al. |
| 5,483,527 A * | 1/1996 | Doshi et al. ................ 370/399 |
| 5,504,744 A | 4/1996 | Adams et al. |
| 5,509,010 A * | 4/1996 | La Porta et al. ............ 370/397 |
| 5,544,163 A | 8/1996 | Madonna |
| 5,568,475 A | 10/1996 | Doshi et al. |
| 5,592,477 A | 1/1997 | Farris et al. |
| 5,606,553 A | 2/1997 | Christie |
| 5,623,491 A | 4/1997 | Skoog |
| 5,703,876 A | 12/1997 | Christie |
| 5,710,769 A | 1/1998 | Anderson et al. |
| 5,732,131 A | 3/1998 | Nimmagadda et al. |
| 5,751,706 A | 5/1998 | Land |
| 5,784,371 A | 7/1998 | Iwai |
| 5,793,857 A | 8/1998 | Barnes et al. |
| 5,802,045 A | 9/1998 | Kos |
| 5,805,588 A | 9/1998 | Peterson |
| 5,825,780 A | 10/1998 | Christie |
| 5,854,836 A | 12/1998 | Nimmagadda |
| 5,867,570 A * | 2/1999 | Bargout et al. ........ 379/221.13 |
| 5,881,145 A | 3/1999 | Giuhat et al. |
| 5,940,393 A | 8/1999 | Duree et al. |
| 5,940,491 A | 8/1999 | Anderson et al. |
| 5,940,492 A | 8/1999 | Galloway et al. |
| 5,949,871 A | 9/1999 | Kabay et al. |
| 5,991,301 A | 11/1999 | Christie |
| 6,014,378 A | 1/2000 | Christie |
| 6,026,091 A | 2/2000 | Christie et al. |
| 6,031,840 A | 2/2000 | Christie et al. |
| 6,064,887 A | 5/2000 | Kallioniemi et al. |
| 6,069,890 A | 5/2000 | White et al. |
| 6,078,657 A | 6/2000 | Alfieri et al. |
| 6,081,525 A | 6/2000 | Christie et al. |
| 6,097,801 A | 8/2000 | Williams et al. |
| 6,181,703 B1 | 1/2001 | Christie et al. |
| 6,272,142 B1 | 8/2001 | Christie et al. |
| 6,314,096 B1 | 11/2001 | Tanabe et al. |
| 6,324,179 B1 | 11/2001 | Doshi et al. |
| 6,411,627 B1 | 6/2002 | Hullett |
| 6,473,429 B1 | 10/2002 | Christie |
| 6,618,372 B1 | 9/2003 | Tanabe |
| 6,639,912 B1 | 10/2003 | Christie et al. |
| 6,795,440 B1 | 9/2004 | Christie |

* cited by examiner

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/DATE |
|---|---|---|---|---|---|---|---|---|---|---|---|---|
| | | | | | | | | | | | | |
| | | | | | | | | | | | | |
| | | | | | | | | | | | | |

FIG. 11

| TRUNK GROUP NUMBER | GLARE RESOLUTION | CONTINUITY CONTROL | CLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 12

| EXCEPTION TABLE INDEX | CARRIER SELECTION IDENTIFICATION | CARRIER IDENTIFICATION | NATURE OF ADDRESS | CALLED PARTY | | NEXT FUNCTION | INDEX |
|---|---|---|---|---|---|---|---|
| | | | | DIGITS FROM | DIGITS TO | | |
| | | | | | | | |
| | | | | | | | |

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |
| | | | | | | | | |

FIG. 15

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 16

| ROUTING TABLE INDEX | TRANSIT NETWORK SELECTION | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|
| | NETWORK IDENTIFICATION PLAN | DIGITS FROM | DIGITS TO | | | | | | | |
| | | | | | | | | | | |
| | | | | | | | | | | |

FIG. 17

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

| MESSAGE TYPE | PARAMETERS | INDEX #1 | INDEX # ... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 18*

NUMBER PORTABILITY IN A COMMUNICATIONS SYSTEM

RELATED APPLICATIONS

This application is a continuation of application Ser. No. 10/077,544 filed on Feb. 15, 2000, now U.S. Pat. No. 6,639,912, which is a continuation of application Ser. No. 09/272,131 filed on Mar. 19, 1999, now U.S. Pat. No. 6,795,440, which is a continuation of application Ser. No. 08/755,268 filed on Nov. 22, 1996, now U.S. Pat. No. 6,014,378, filed on Nov. 22, 1996. U.S. Pat. Nos. 6,639,912, 6,795,440, and 6,014,378 are hereby incorporated by reference into this application.

FEDERALLY SPONSERED RESEARCH OR DEVELOPMENT

Not applicable

MICROFICHE APPENDIX

Not applicable

BACKGROUND OF THE INVENTION

1. Field of the Invention

The invention relates to tandem systems for circuit-based traffic, and in particular, to tandem systems that use Asynchronous Transfer Mode (ATM) systems to interconnect various circuit-based networks or network elements.

2. Description of the Prior Art

The tandem function is used to concentrate and switch telecommunications traffic in between networks, switches, and other network elements. FIG. 1 depicts the conventional tandem switch known in the prior art. The three switches and the network element are all connected to the tandem switch. The tandem switch allows the switches to connect to the network element without a direct connection between the switches and the network element. It also allows each switch to connect to every other switch without direct connections between all of the switches. This savings in connections and trunking is one of the benefits of tandem switches. Additionally, the connection between the tandem switch and the network element uses bandwidth more efficiently because traffic has been concentrated at the tandem switch. In addition, a tandem switch can be used to concentrate traffic that is going to other networks.

The connections shown on FIG. 1 as solid lines are circuit-based connections. Circuit-based connections are well known in the art with some examples being Time Division Multiplex (TDM) connections, such as DS3, DS1, DS0, E3, E1, or E0 connections. DS3 connections carry a continuous transport signal at 44.736 megabits per second. DS1 connections carry a continuous transport signal at 1.544 megabits per second. DS0 connections carry a continuous transport signal at 64 kilobits per second. As is known, DS3 connections can be comprised of multiple DS1 connections, which in turn, can be comprised of multiple DS0 connections. The signaling links shown as dashed lines may be conventional signaling links with examples being SS7, C7, or ISDN links. The switches shown on FIG. 1 are well known circuit switches with examples being the Nortel DMS-250 or the Lucent 5ESS. The tandem switch is typically comprised of a circuit switch that interconnects DS3, DS1, and DS0 connections.

Those skilled in the art are aware of the costs and efficiencies associated with tandem switches. Many networks cannot justify implementing a tandem switch until the efficiencies gained through the tandem function outweigh the cost of the tandem switch. This is problematic because inefficiencies must be tolerated until they outweigh the high cost of the tandem switch. At present, there is a need for a more affordable and efficient tandem switching system.

SUMMARY

The invention includes a telecommunications tandem system and method for providing a tandem connection for a call. The tandem system comprises a first ATM interworking multiplexer, an ATM cross-connect, a second ATM interworking multiplexer, and a signaling processor. The first ATM interworking multiplexer receives circuit-based traffic for the call from a first circuit-based connection. It converts the circuit-based traffic into ATM cells that identify a selected virtual connection based on a first control message and transmits the ATM cells. The ATM cross-connect is connected to the first ATM interworking multiplexer. It receives the ATM cells from the first ATM interworking multiplexer and routes the ATM cells based on the selected virtual connection identified in the ATM cells. The second ATM interworking multiplexer that is connected to the ATM cross-connect. It receives the ATM cells from the ATM cross-connect. It converts the ATM cells into the circuit-based traffic and transmits the circuit-based traffic over a selected second circuit-based connection based on a second control message. The signaling processor is linked to the first ATM multiplexer and the second ATM multiplexer. It receives and processes telecommunications signaling for the call to select the virtual connection and the second circuit-based connection. It provides the first control message for the call to the first ATM multiplexer and provides the second control message for the call to the second ATM multiplexer. The first control message identifies the first circuit-based connection and the selected virtual connection. The second control message identifies the selected virtual connection and the selected second circuit-based connection. As a result, the tandem connection is formed by the first circuit based connection, the selected virtual connection, and the selected second circuit based connection.

In various other embodiments. The tandem system provides the tandem connection for the call between: two circuit-based switches, two circuit-based switching networks, a circuit-based switch and an enhanced services platform, an incumbent local exchange carrier and a competitive local exchange carrier, a first competitive local exchange carrier and a second competitive local exchange carrier, a local exchange carrier and an interexchange carrier, for the call, a local exchange carrier and an international carrier, an interexchange carrier and an international carrier.

In various embodiments, the signaling processor selects the connections for the call based on: a call set-up message, a Signaling System #7 Initial Address Message (SS7 IAM), a called number, an NPA, an NXX, an NPA-NXX, a destination network, a transit network selection code, a carrier identification parameter, a nature of address, a network element identifier, a local route number, or a trunk group.

In various embodiments, numerous physical limitations may also distinguish the invention. The first ATM multiplexer and the second ATM multiplexer may be incorporated into a single ATM multiplexer. The first control message and the second control message may be incorporated into a single control message. The first ATM multiplexer, the second ATM multiplexer, and the ATM cross-connect may be physically located at the same site. The signaling processor, the first ATM multiplexer, the second ATM multiplexer, and the ATM cross-connect may be physically located at the same site.

Advantageously, the invention provides a tandem function between circuit based systems without the need for a circuit-based switch or an ATM switch. The invention is capable of accomplishing various forms of tandem routing without requiring a full set of complex routing logic. For example, the invention may only analyze a destination network code to select a tandem connection and could omit the need to analyze a called number. The invention is also capable of providing an ATM interface.

BRIEF DESCRIPTION OF THE DRAWINGS

FIG. 11 depicts an example of the trunk circuit table.

FIG. 12 depicts an example of the trunk group table.

FIG. 13 depicts an example of the exception table.

FIG. 14 depicts an example of the ANI table.

FIG. 15 depicts an example of the called number table.

FIG. 16 depicts an example of the routing table.

FIG. 17 depicts an example of the treatment table.

FIG. 18 depicts an example of the message table.

DETAILED DESCRIPTION

Figure 1:
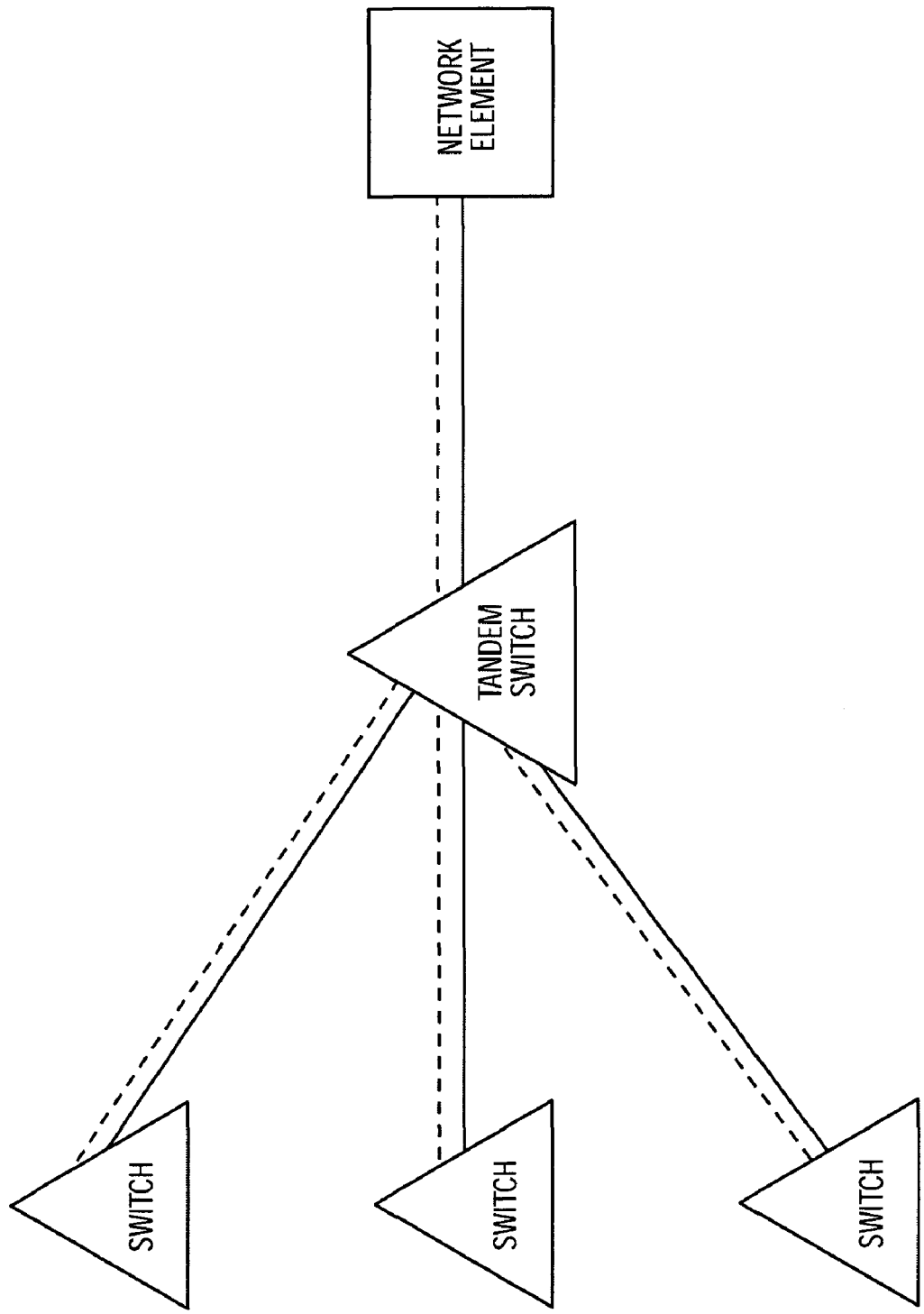
FIG. 1 is a block diagram of a version of the prior art.

For purposes of clarity, the term "connection" will be used to refer to the transmission media used to carry user traffic. The term "link" will be used to refer to the transmission media used to carry signaling or control messages. FIG. 1 depicts a prior art tandem switch. Shown are three switches connected to a network element through the tandem switch. The switches are also connected to each other through the tandem switch. The use of the tandem switch avoids the need for direct connections between all of these switches and the network element. The use of the tandem switch also avoids the need for direct connections between the switches themselves. Typically, the tandem switch is comprised of a conventional circuit switch.

Figure 2:
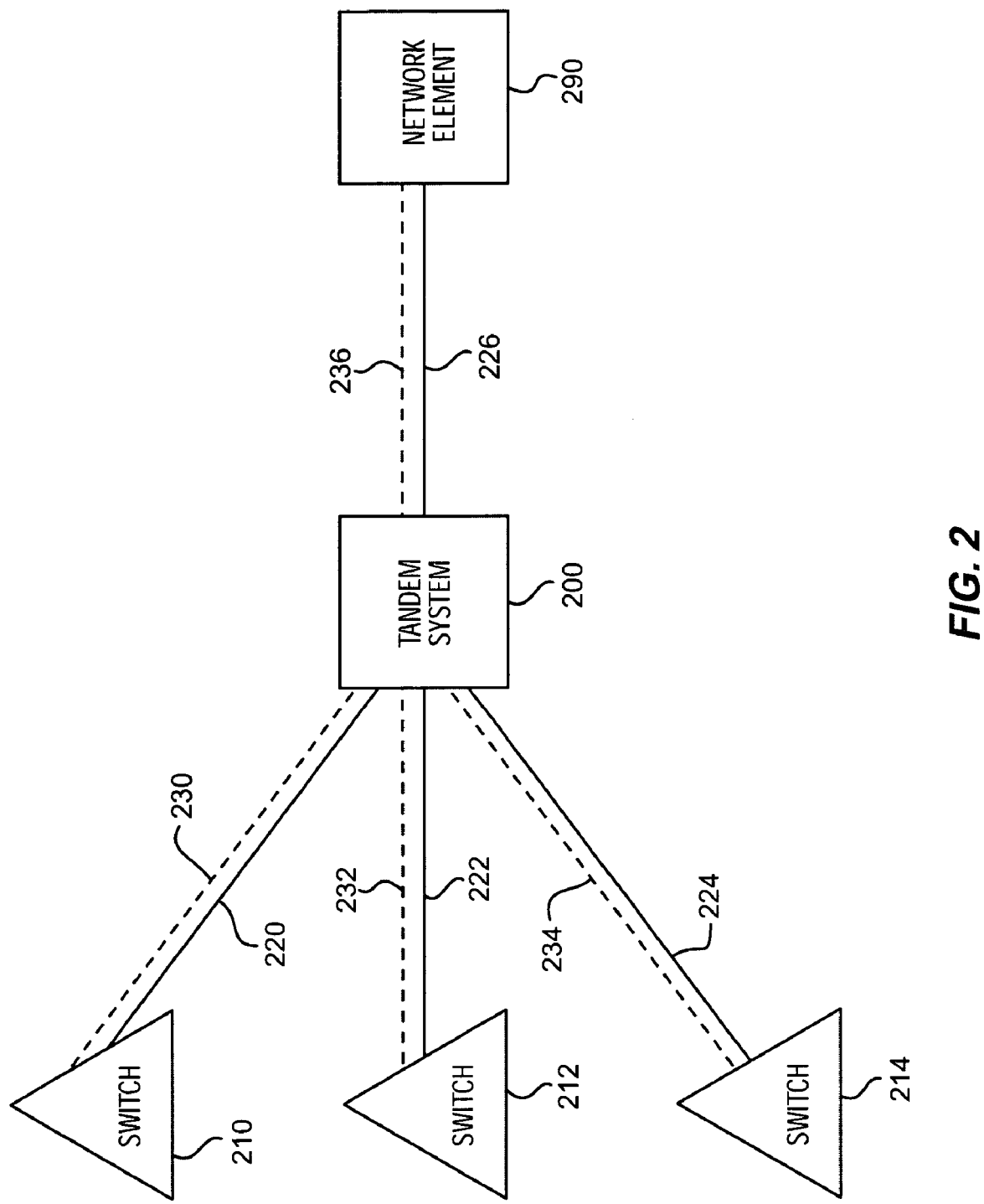
FIG. 2 is a block diagram of a version of the present invention.

FIG. 2 depicts a version of the present invention. Shown is tandem system 200, switch 210, switch 212, switch 214, and network element 290. Switches 210, 212, and 214 are connected to tandem system 200 by connections 220, 222, and 224 respectively. Switches 210, 212, and 214 are linked to tandem system 200 by links 230, 232, and 234 respectively. As stated above, the "connections" carry telecommunications traffic and the "links" carry telecommunications signaling and control messages. Tandem system 200 is also connected and linked to network element 290 by connection 226 and link 236.

Those skilled in the art are aware that large networks have many more components than are shown. For example, there would typically be a multitude of switches and network elements connected through tandem system 200. Those skilled in the art will appreciate that a signal transfer point (STP) could be used to transfer signaling among the various components. The number of components shown on FIG. 2 has been restricted for clarity. The invention is fully applicable to a large network.

Switches 210, 212, and 214 could be conventional circuit switches or any source of circuit-based traffic. Network element 290 represents any element that accepts circuit-based traffic. Examples of such network elements are switches and enhanced service platforms. Often, network element 290 would be in a different telecommunications network than switches 210, 212, and 214. Connections 220, 222, 224, and 226 could be any connection that carries circuit-based traffic. Typically, these are DS3 or DS1 connections. Typically, the common DS0 used for traditional voice calls is embedded within the DS3 or DS1. Links 230, 232, 234, and 236 are any links that carry telecommunications signaling or control messages with an example being a Signaling System #7 (SS7) link. Those skilled in the art are familiar with circuit-based traffic and signaling.

Tandem system 200 is a set of components that are operational to accept circuit-based traffic and signaling, and then switch the traffic to the proper destination in accord with the signaling. An example would be where switch 210 handles a call destined for network element 290. Switch 210 would seize a call connection within connection 220 to tandem system 200. Typically, this call connection is a DS0 embedded within a DS3. Additionally, switch 210 will forward an SS7 Initial Address Message (IAM) to tandem system 200 over link 230. An IAM contains information such as the dialed number, the caller's number, and the circuit identification code (CIC). The CIC identifies the incoming DS0 in connection 220 that is used for the call. Tandem system 200 will receive and process the IAM and select an outgoing connection for the call. In this example, this would be a DS0 embedded within connection 226 to network element 290. As a result, tandem system 200 will connect the DS0 in connection 220 to the selected DS0 in connection 226. Additionally, tandem system 200 may forward an IAM or other message to network element 290 over link 236. The same basic procedure could be used to connect a call from switch 214 to switch 212, or to connect a call from network element 290 to switch 214.

Tandem system 200 operates using the following technique. Tandem system 200 converts the incoming circuit-based traffic into Asynchronous Transfer Mode (ATM) cells. It also processes the incoming signaling associated with the traffic to select appropriate ATM connections for the cells. It then routes the cells through an ATM matrix. After leaving the matrix, the ATM cells are converted back into a circuit-based format and provided to a selected circuit-based connection. By controlling the selections of the ATM connection and circuit-based connection, tandem system 200 is able to connect any inbound circuit-based connection to any outbound circuit-based connection. For example, any incoming DS0 could be connected to any outbound DS0 by selecting the appropriate ATM virtual channel and outbound DS0 within the tandem system. It should be pointed out that the use of ATM can be completely internal to tandem system 200 and can be transparent to the external network outside of tandem system 200. In some embodiments, tandem system 200 could also receive and transmit ATM traffic in addition to circuit-based traffic.

Figure 3:
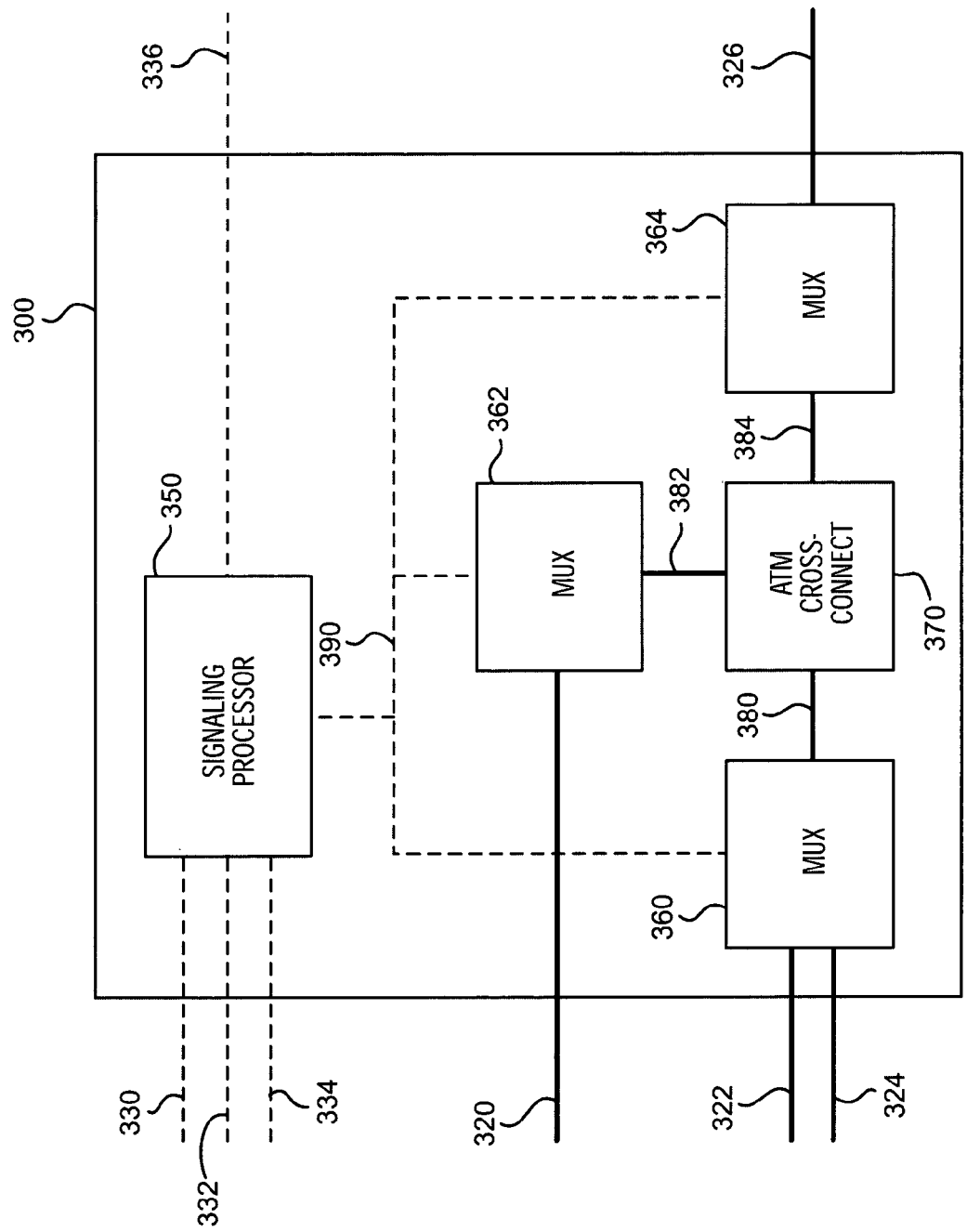
FIG. 3 is a block diagram of a version of the present invention.

FIG. 3 depicts tandem system 300 which is a version of the tandem system from FIG. 2. Those skilled in the art will appreciate variations from this version that are also contemplated by the invention. Tandem system 300 has connections 320, 322, 324, and 326 that correspond to connections 220, 222, 224, and 226 of FIG. 2. Tandem system 300 has links 330, 332, 334, and 336 that correspond to links 230, 232, 234, and 236 of FIG. 2.

Tandem system 300 is comprised of signaling processor 350, ATM interworking multiplexer (mux) 360, mux 362, mux 364, and ATM cross-connect 370. Mux 360 is connected to cross-connect 370 by connection 380. Mux 362 is connected to cross-connect 370 by connection 382. Mux 364 is connected to cross-connect 370 by connection 384. Muxes 360, 362, and 364 are linked to signaling processor 350 by link 390.

Connections 380, 382, and 384 could be any connections that support ATM. Link 390 could be any link capable of transporting control messages. Examples of such a link could be SS7 links, UDP/IP or TCP/IP over Ethernet, or a bus arrangement using a conventional bus protocol.

Signaling processor 350 is any processing platform that can receive and process signaling to select virtual connections and circuit-based connections, and then generate and transmit messages to identify the selections. Various forms of signaling are contemplated by the invention, including ISDN, SS7, and C7. A preferred embodiment of the signaling processor is discussed in detail toward the end of the disclosure.

Muxes 360, 362, and 364 could be any system operable to interwork traffic between ATM and non-ATM formats in accord with control messages from signaling processor 350. These control messages are typically provided on a call-by-call basis and identify an assignment of a DS0 to a Virtual Path Identifiers/Virtual Channel Identifier (VPI/VCI). The mux would interwork the user traffic between the DS0 and ATM based on the control messages. For example, a mux might receive a DS0 call connection and convert this traffic into ATM cells with a VPI/VCI selected by signaling processor. A mux may also receive ATM cells from ATM cross-connect 370. These ATM cells would be converted back into the DS0 format and provided to the DS0 call connection selected by signaling processor 350. In some embodiments, the muxes are operational to implement digital signal processing as instructed in control messages (typically from signaling processor 350). An example of digital signal processing would be echo cancellation or continuity testing. A preferred embodiment of these muxes are also discussed in detail below.

ATM cross-connect 370 is any device that provides a plurality of ATM virtual connections between the muxes. An example of an ATM cross-connect is the NEC Model 20. In ATM, virtual connections can be designated by the VPI/VCI in the cell header. Cross-connect 370 can be configured to provide a plurality of VPI/VCI connections between the muxes. The following examples illustrate a possible configuration. VPI "A" could be provisioned from mux 360 through cross-connect 370 to mux 362. VPI "B" could be provisioned from mux 360 through cross-connect 370 and to mux 364. VPI "C" could be provisioned from mux 360 through cross-connect 370 and back to mux 360. Similarly, VPIs could be provisioned from: mux 362 to mux 360, mux 362 to mux 364, mux 362 back to mux 362, mux 364 to mux 360, mux 364 to mux 362, and mux 364 back to mux 364. In this way, the selection of the VPI essentially selects the outgoing mux. The VCIs could be used to differentiate individual calls on the VPI between two muxes.

DS3, DS1, and DS0 connections are bi-directional, whereas ATM connections are unidirectional. This means that the bi-directional connections will typically require two ATM connections—one in each direction. This could be accomplished by assigning a companion VPI/VCI to each VPI/VCI used for call set-up. The muxes would be configured to invoke the companion VPI/VCI in order to provide a return path for the bi-directional connection.

In some embodiments, the signaling processor, the muxes, and the cross-connect will all be physically located at the same site. For example, the tandem system would occupy a single site just as a circuit switch occupies a single site. In this way, the tandem system physically and functionally emulates a tandem circuit switch. However, the component nature of the tandem system allows it to be distributed if desired. For example, in alternative embodiments, the muxes and the cross-connect will be physically located at the same site, but the signaling processor will be located at a remote site.

The system would operate as follows for a call on connection 320 destined for connection 326. In this embodiment, the user information from connection 324 is capable of being muxed to the DS0 level, but this is not required in other embodiments. Additionally, SS7 signaling is used in this embodiment, but other signaling protocols, such as C7 signaling, are also applicable to the invention.

A DS0 in connection 320 would be seized and an IAM related to the call would be received over link 330. Signaling processor 350 would process the IAM to select a VPI/VCI from mux 362 through ATM cross-connect 370 to mux 364. Signaling processor 350 would also select a DS0 on connection 326 from mux 364. These selections may be based on many factors with a few examples being the dialed number or the identity of the destination network. Signaling processor 350 would send a control message over link 390 to mux 362 that identifies both the seized DS0 in connection 320 and the selected VPI/VCI. Signaling processor 350 would also send a control message over link 390 to mux 364 that identifies both the selected VPI/VCI and the selected DS0 in connection 326. If required, signaling processor 350 would also instruct one of the muxes to apply echo cancellation to the call. In addition, signaling processor 350 would transmit any signaling required to continue call set-up over links 330 and 336.

Mux 362 would receive the control message from signaling processor 350 identifying the seized DS0 in connection 320 and the selected VPI/VCI. Mux 362 would then convert the user information from the seized DS0 in connection 320 into ATM cells. Mux 362 would designate the selected VPI/VCI in the cell headers.

The virtual connection designated by the selected VPI/VCI would have been previously provisioned through cross-connect 370 from mux 362 to mux 364. As a result, cells with the selected VPI/VCI are transmitted over connection 382 and transferred by cross-connect 370 over connection 384 to mux 364.

Mux 364 would receive a control message from signaling processor 350 identifying the selected VPI/VCI and the selected DS0 in connection 326. Mux 364 will convert the ATM cells with the selected VPI/VCI in the cell header to the selected DS0 on connection 326. Thus it can be seen that the selections of the VPI/VCI and DS0 by signaling processor 350 can be implemented by muxes 362 and 364 to interconnect DS0s on connection 320 and 326. These interconnections can be provided by tandem system 300 on a call by call basis.

Upon completion of the call, signaling processor 350 would receive a release message (REL) indicating call tear-down. As a result, signaling processor 350 would provide tear down messages to mux 360 and mux 364. When the muxes receive these messages they would disassociate the VPI/VCI and the DS0s. This effectively terminates the call connection and frees up the VPI/VCI and DS0s for use on other calls.

From the above description, it can be seen that call-by-call control over the VPI/VCIs and DS0s at the ATM/DS0 interworking point is used to interconnect the traffic from incoming DS0s to outbound DS0s. This interworking point where traffic is converted is in the muxes. Unlike conventional circuit switches, the matrix (i.e. the cross-connect) is not controlled on a call-by-call basis. It is merely provisioned to interconnect the muxes. This greatly simplifies the invention over conventional tandem switches. This unique combination of components and control provides many advantages for a tandem system. It can typically be produced at lower costs than a conventional tandem circuit switch. The components of the tandem system are readily scaleable, so that the size of the tandem system can be tailored to specific traffic demands and upgraded as needed. As will be seen, the signaling processor is not integrated within a switch. This allows it to be tailored more readily to a given task. For example, robust and expensive routing logic may not be required.

Figure 4:
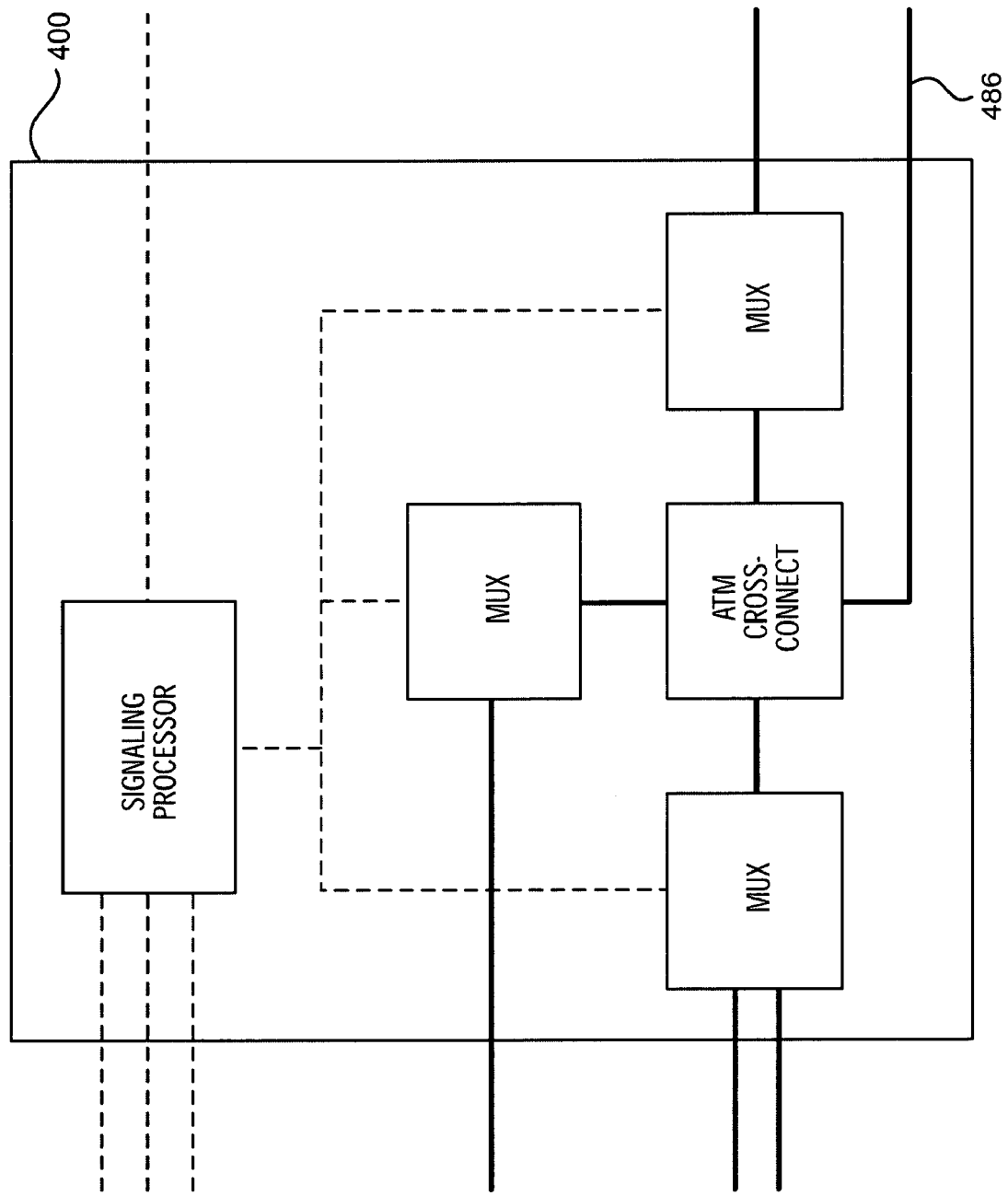
FIG. 4 is a block diagram of a version of the present invention.

FIG. 4 depicts tandem system 400. Tandem system 400 is the same as tandem system 300 from FIG. 3, except that connection 486 has been added. For the purposes of clarity, the other reference numbers have been omitted. Connection 486 is ATM connection. Typically, the ATM connection would use a transport protocol, such as SONET or DS3, but others are also known. Connection 486 provides ATM systems with access to tandem system 400. This access occurs through the cross-connect. The cross-connect would be provisioned to connect particular VPI/VCIs on connection 486 to particular muxes. In this way, non-ATM traffic entering tandem system 400 through a mux could egress the system in the ATM format over connection 486. Additionally, ATM traffic could enter tandem system 400 over connection 486 and egress through a mux on a non-ATM connection. In some embodiments, a signaling link from the signaling processor to the cross-connect could be used to exchange B-ISDN signaling between the signaling processor and the ATM system through the cross-connect and connection 486. In such an embodiment, B-ISDN signaling VPI/VCIs are provisioned through the cross-connect between the signaling processor and the ATM system. Advantageously, tandem system 400 provides tandem access to and from ATM systems.

Figure 5:
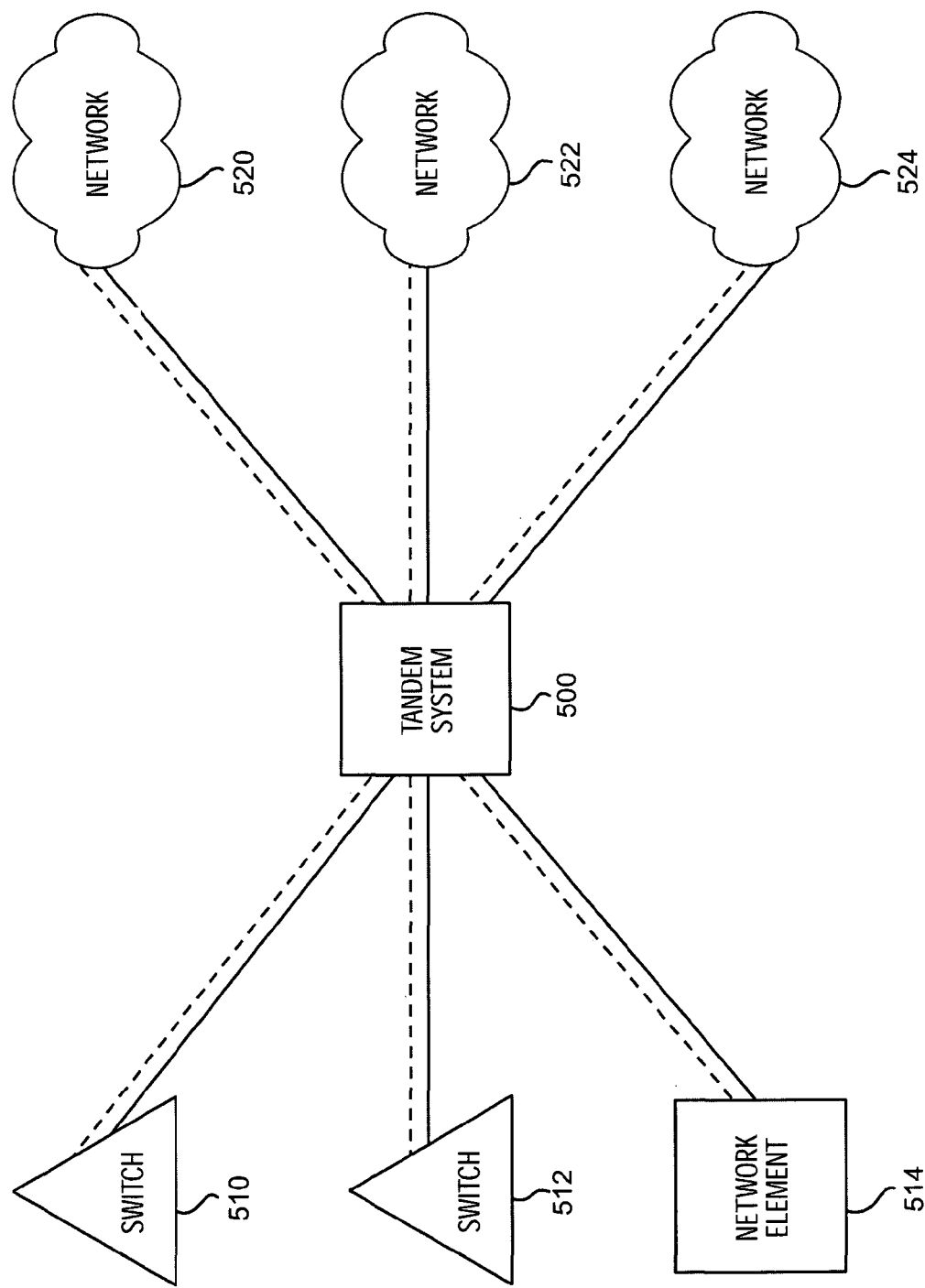
FIG. 5 is a logic diagram of a version of the present invention.

FIG. 5 depicts tandem system 500, switch 510, switch 512, network element 514, network 520, network 522, and network 524. These components are all known in the art and are connected and linked as shown on FIG. 5. These connections and links are as described above, but for the sake of clarity, the connections and links are not numbered. Tandem system 500 operates as described above.

FIG. 5 is provided to illustrate various routing features of tandem system 500. Because tandem system 500 may be implemented to provide a specific type of tandem function, the routing can be tailored to the specific needs as well. Advantageously, this can simplify the complexity and cost of tandem system 500.

In one embodiment, tandem system 500 routes based on the area code (NPA) in a dialed number. This could be the case where switches 510 and 512 provide traffic to tandem system 500 for routing to network element 514 and networks 520, 522, and 524. If the network element and networks can be differentiated for purposes of routing by area code, then tandem system 500 need not be configured with complex routing logic.

In one embodiment, tandem system 500 routes based on the exchange code (NXX) in a dialed number. This might be the case where switches 510 and 512, network element 514, and networks 520, 522, and 524 are all in the same area code. If these components are in the same area code, but can be differentiated for purposes of routing by NXX, then tandem system 500 need not be configured with complex routing logic. In another embodiment, tandem system 500 could route based on both NPA and NXX.

In some embodiments, tandem system 500 could route based on the identity of the destination network. Often, the identity of the next network in the call path is provided in a signaling message. Tandem system 500 would receive the signaling message over a signaling link an identify the destination network. The SS7 IAM includes a transit network selection code or a carrier identification parameter. Either of these codes can be used by tandem system 500 to identify the destination network and select a route to the destination network. For example, switch 512 may identify network 524 as the destination network in the IAM to tandem system 500. By reading the carrier identification parameter in the IAM, tandem system 500 could identify network 524 as the destination and select a route to network 524. This eliminates significant call processing and simplifies tandem system 500.

In some embodiments, tandem system 500 could read the nature of address in the IAM to identify types of operator assisted and international calls. Once identified, the calls could be routed to the appropriate operator system or international carrier.

In some embodiments, the tandem system 500 may facilitate routing in a number portability scenario. Number portability allows called parties to retain their telephone number when they move. When a network encounters one of these ported numbers, it will launch a TCAP query to a database that can identify the new network element that now serves the called party. (Typically, this new network element is the class 5 switch where the called party is now located.) The identity of the network element is provided in a TCAP response back to the network element that sent the query. The TCAP response identifies the new network element that now serves the called party. This identification can be a local route number contained in the TCAP.

In the context of the invention, tandem system 500 could support number portability. Tandem system 500 could query the database and route to the appropriate network based on the local route number in the TCAP response. Tandem system 500 could also receive calls from systems that have already queried the number portability database. In this case, tandem system 500 would use the local route number in the signaling to identify the destination network and route the call.

In some embodiments, the key to routing the call will be trunk group selection. Trunk groups typically contain many DS0s. For example, the connections between tandem system 500 and networks 520, 522, and 524 could each be a trunk group. For calls received from switches 510 and 512, tandem system 500 may only need to determine which of these three trunk groups to use. This is because the selection of the trunk group effectively routes the call to the proper network. The selection of the DS0 within the selected trunk group is based on the availability within the selected trunk group.

Figure 6:
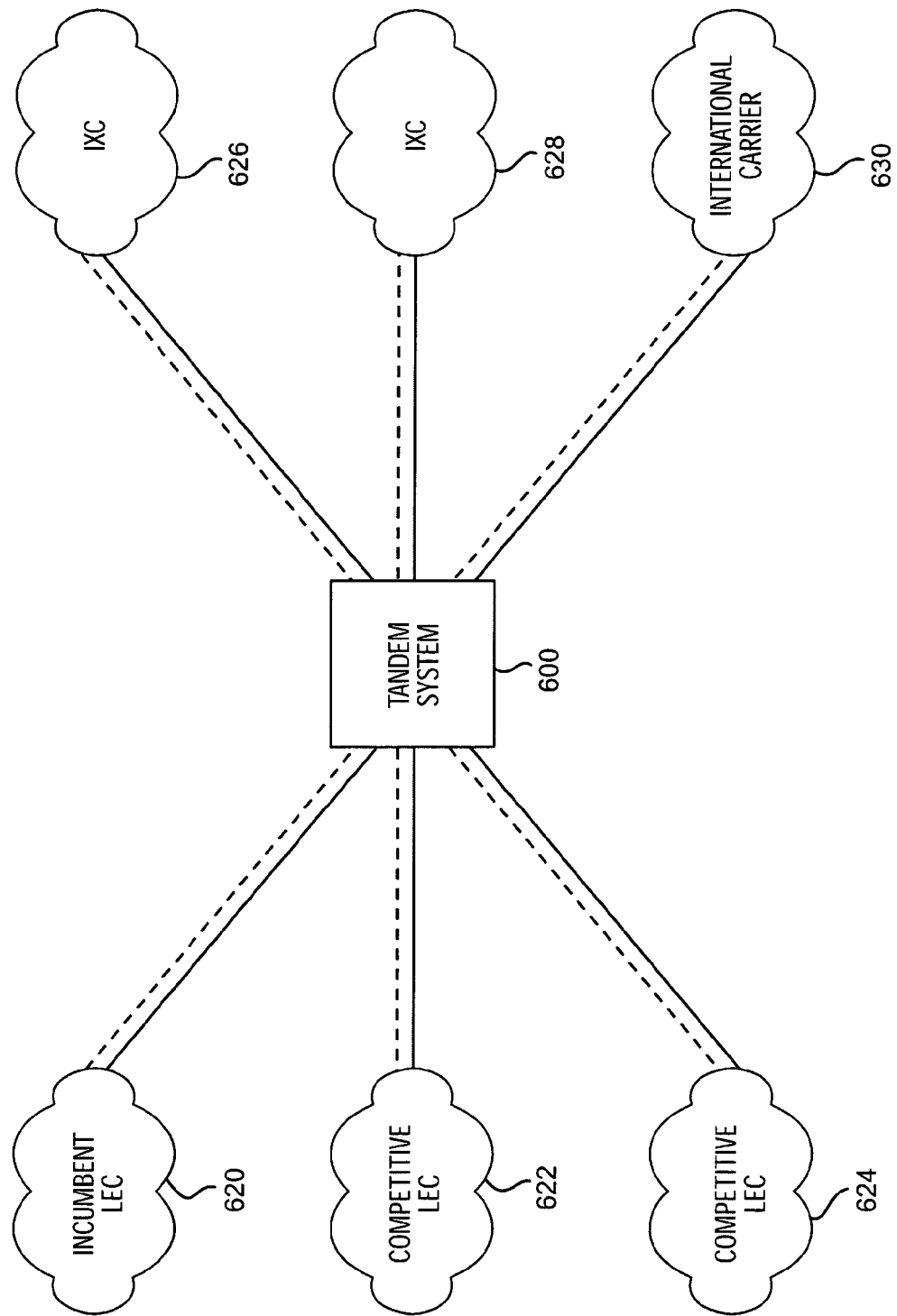
FIG. 6 is a logic diagram of a version of the invention.

FIG. 6 depicts tandem system 600, Incumbent Local Exchange Carrier (ILEC) 620, Competitive Local Exchange Carrier (CLEC) 622, CLEC 624, Interexchange Carrier (IXC) 626, IXC 628, and international carrier 630. These networks are familiar to those skilled in the art and are connected and linked as shown. Examples of the connections are DS1, DS3 or ATM connections and examples of the links are SS7 links, although other connections and links that apply are also known. ILECs are the established local networks. The CLECs are newer local networks that are allowed to compete with the established local networks. As a result, numerous LECs—either incumbent or competitive—will provide services to the same area. These ILECs and CLECs will need access to each other. They will also need access to IXCs for long distance calls and to international carriers for international calls. Tandem system 600 is similar to the tandem systems described above and it provides interconnection among these networks. For example, all local calls from ILEC 620 to CLEC 622 may use tandem system 600 for the interconnection. Call signaling and connections would be provided to tandem system 600 by ILEC 620. Tandem system would process the signaling and interconnect the calls to CLEC 622. Tandem system 600 would typically send additional signaling to CLEC 622 to facilitate call completion.

Similar arrangements could be made between the other networks. Tandem system 600 could provide tandem access between the following combinations: CLEC and CLEC, CLEC and ILEC, ILEC and IXC, CLEC and IXC, IXC and IXC, ILEC and international carrier, CLEC and international carrier, and IXC and international carrier. In some cases this routing could be effected by processing the local routing number, transit network selection code, or carrier identification parameter. In this way, call processing at tandem system 600 is simplified, yet each network has access to the other networks without managing multiple connections.

The ATM Interworking Multiplexer

Figure 7:
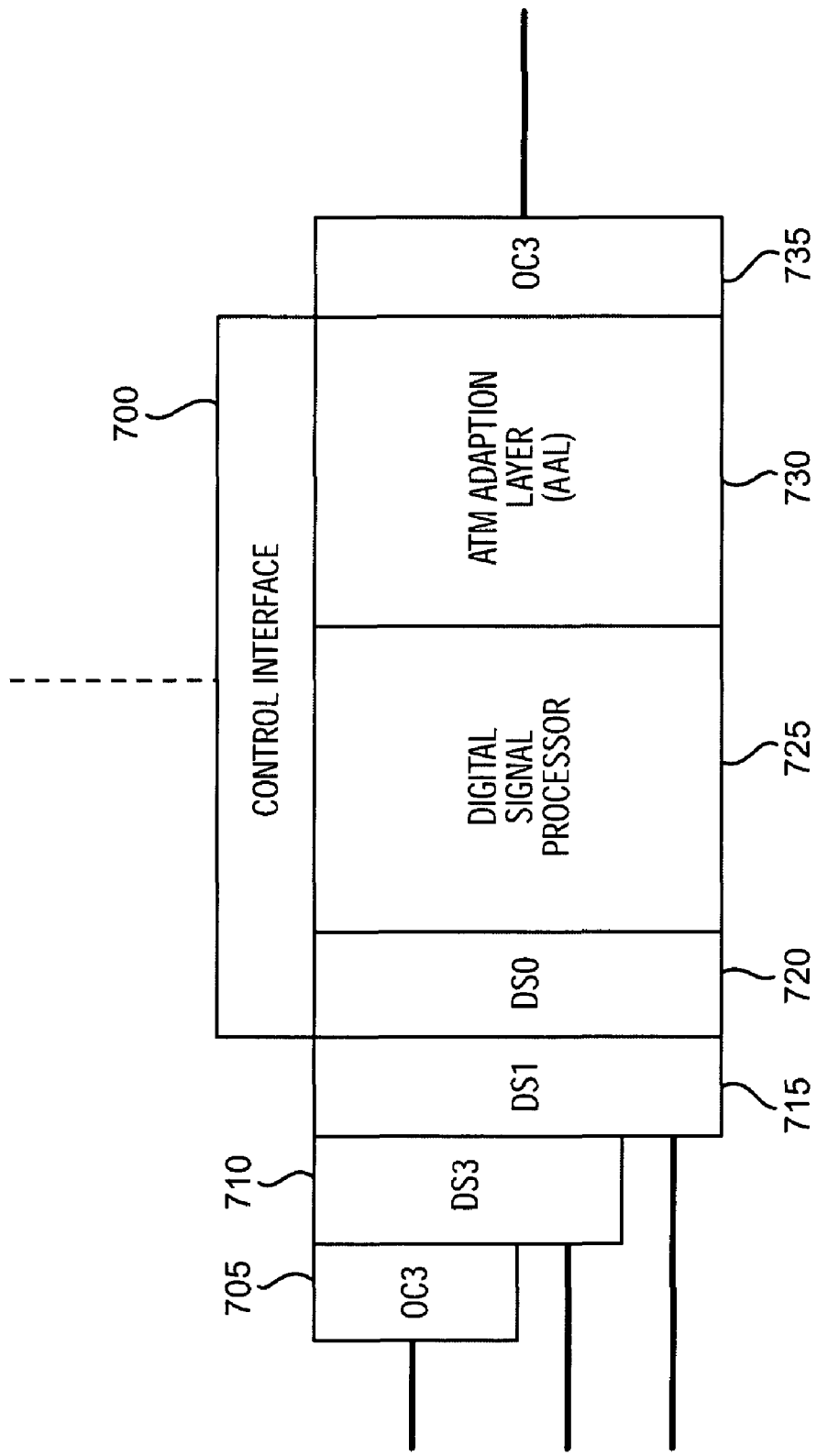
FIG. 7 is a message sequence chart of a version of the invention.

FIG. 7 shows one embodiment of the mux that is suitable for the present invention, but other muxes that support the requirements of the invention are also applicable. Shown are control interface 700, OC-3 interface 705, DS3 interface 710, DS1 interface 715, DS0 interface 720, digital signal processor 325, ATM adaption Layer (AAL) 730, and OC-3 interface 735.

Control interface 700 accepts messages from the signaling processor. In particular, control interface 700 provides DS0/virtual connection assignments to AAL 730 for implementation. Control interface 700 may accept control messages from the signaling processor with messages for DS0 720. These messages could be to connect DS0s to: 1) other DS0s, 2) digital signal processor 725, or 3) AAL 730 (bypassing digital signal processor 725). Control interface 700 may accept control messages from the signaling processor with messages for digital signal processing 725. An example of such an message would be to disable an echo canceller on a particular connection.

OC-3 interface 705 accepts the OC-3 format and makes the conversion to DS3. DS3 interface 710 accepts the DS3 format and makes the conversion to DS1. DS3 interface 710 can accept DS3s from OC-3 interface 705 or from an external connection. DS1 interface 715 accepts the DS1 format and makes the conversion to DS0. DS1 interface 715 can accept DS1s from DS3 interface 710 or from an external connection. DS0 interface 720 accepts the DS0 format and provides an interface to digital signal processor 725 or AAL 730. In some embodiments, DS0 interface 420 could be capable of directly interconnecting particular DS0s. This could be the case for call entering and egressing from the same mux. This would also be useful to facilitate continuity testing by a switch. OC-3 interface 735 is operational to accept ATM cells from AAL 730 and transmit them, typically over the connection to a cross-connect.

Digital signal processor 725 is operational to apply various digital processes to particular DS0s in response to control messages received through control interface 700. Examples of digital processing include: tone detection, tone transmission, loopbacks, voice detection, voice messaging, echo cancellation, compression, and encryption. In some embodiments, digital signal processing 725 could handle continuity testing. For example, the signaling processor may instruct the mux to provide a loopback for a continuity test and or disable cancellation for a call. Digital signal processor 725 is connected to AAL 730. As discussed, DS0s from DS0 interface 720 may bypass digital signal processing 725 and be directly coupled to AAL 730.

AAL 730 comprises both a convergence sublayer and a segmentation and reassembly (SAR) layer. AAL 730 is operational to accept the user information in DS0 format from DS0 interface 720 or digital signal processor 725 and convert the information into ATM cells. AALs are known in the art and information about AALs is provided by International Telecommunications Union (ITU) document 1.363. An AAL for voice is also described in U.S. patent application Ser. No. 08/395,745, filed on Feb. 28, 1995, entitled "Cell Processing for Voice Transmission", and hereby incorporated by reference into this application. AAL 730 obtains the virtual path identifier (VPI) and virtual channel identifier (VCI) for each call from control interface 700. AAL 730 also obtains the identity of the DS0 for each call (or the DS0s for an N×64 call). AAL 730 then converts user information between the identified DS0 and the identified ATM virtual connection. Acknowledgments that the assignments have been implemented may be sent back to the signaling processor if desired. Calls with a bit rate that are a multiple of 64 kbit/second are known as N×64 calls. If desired, AAL 730 can be capable of accepting control messages through control interface 700 for N×64 calls.

As discussed above, the mux also handles calls in the opposite direction—from OC-3 interface 735 to DS0 interface 720. This traffic would have been converted to ATM by another mux and routed to OC-3 735 by the cross-connect over the selected VPI/VCI. Control interface 700 will provide AAL 730 with the assignment of the selected VPI/VCI to the selected outbound DS0. The mux will convert the ATM cells with the selected VPI/VCI in the cell headers into the DS0 format and provide it to the selected outbound DS0 connection.

A technique for processing VPI/VCIs is disclosed in U.S. Pat. No. 5,940,393, which is hereby incorporated by reference into this application.

DS0 connections are bi-directional and ATM connections are typically unidirectional. As a result, two virtual connections in opposing directions will typically be required for each DS0. As discussed, this can be accomplished provisioning the cross-connect with companion VPI/VCIs in the opposite direction as the original VPI/VCIs. On each call, the muxes would be configured to automatically invoke the particular companion VPI/VCI to provide a bidirectional virtual connection to match the bi-directional DS0 on the call.

The Signaling Processor

The signaling processor is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in U.S. Pat. No. 6,013,840 which is assigned to the same assignee as this patent application, and which is incorporated herein by reference.

In addition to selecting connections, the CCM performs many other functions in the context of call processing. It not only can control routing and select the actual connections, but it can also validate callers, control echo cancellers, generate billing information, invoke intelligent network functions, access remote databases, manage traffic, and balance network loads. One skilled in the art will appreciate how the CCM described below can be adapted to operate in the above embodiments.

Figure 8:
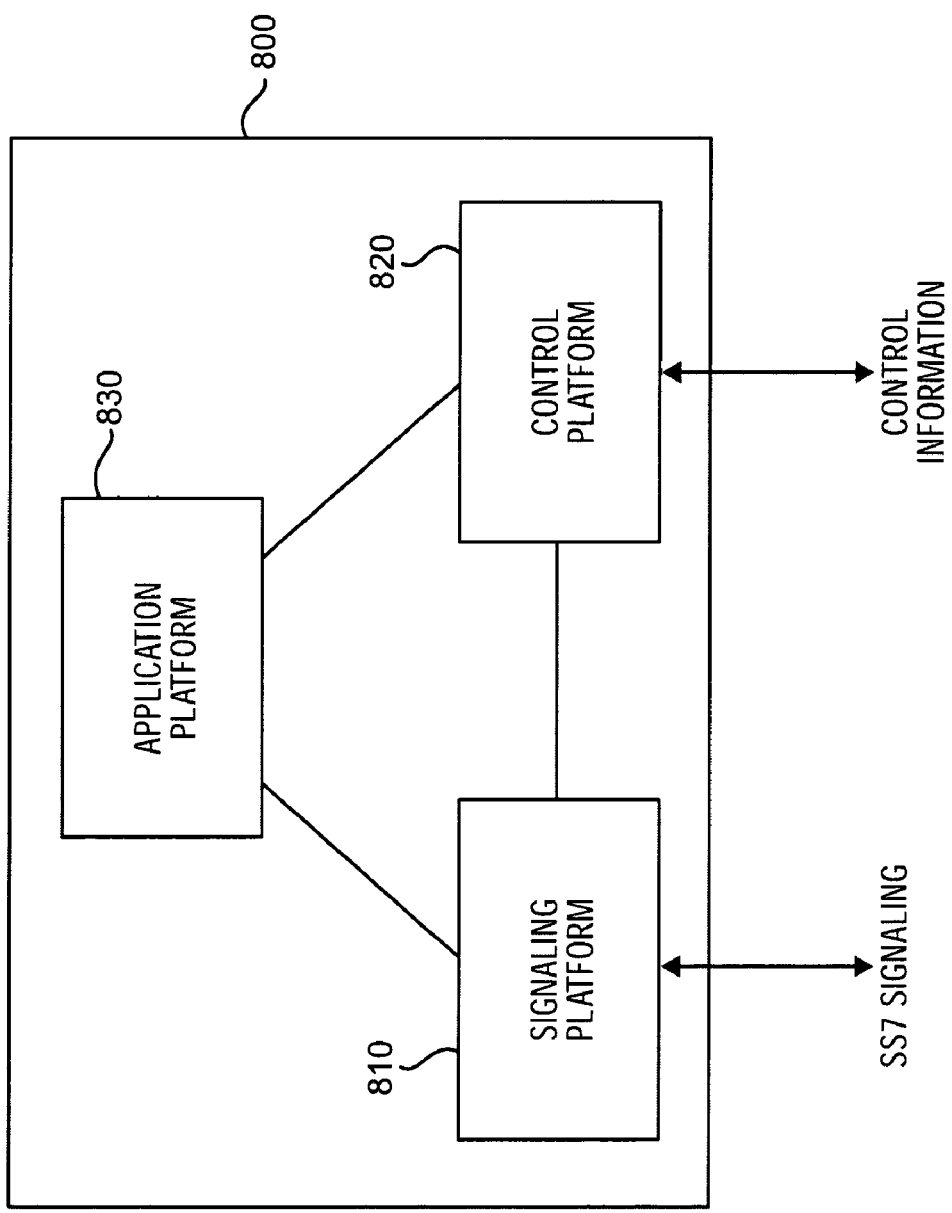
FIG. 8 is a block diagram of a version of the present invention.

FIG. 8 depicts a version of the CCM. Other versions are also contemplated. In the embodiment of FIG. 8, CCM 800 controls an ATM interworking multiplexer (mux) that performs interworking of DS0s and VPI/VCIs. However, the CCM may control other communications devices and connections in other embodiments.

CCM 800 comprises signaling platform 810, control platform 820, and application platform 830. Each of the platforms 810, 820, and 830 is coupled to the other platforms.

Signaling platform 810 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). Control platform 820 is externally coupled to a mux control, an echo control, a resource control, billing, and operations.

Signaling platform 810 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

Control platform 820 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loop back or to send and detect a tone for a continuity test.

The billing interface transfers pertinent billing information to a billing system. Typical billing information includes the parties to the call, time points for the call, and any special features applied to the call. The operations interface allows for the configuration and control of CCM 800. One skilled in the art will appreciate how to produce the software for the interfaces in control platform 820.

Application platform 830 is functional to process signaling information from signaling platform 810 in order to select connections. The identity of the selected connections are provided to control platform 820 for the mux interface. Application platform 830 is responsible for validation, translation, routing, call control, exceptions, screening, and error handling. In addition to providing the control requirements for the mux, application platform 830 also provides requirements for echo control and resource control to the appropriate interface of control platform 820. In addition, application platform 830 generates signaling information for transmission by signaling platform 810. The signaling information might be ISUP, INAP, or TCAP messages to external network elements. Pertinent information for each call is stored in a call control block (CCB) for the call. The CCB can be used for tracking and billing the call.

Application platform 830 operates in general accord with the Basic Call Model (BCM) defined by the ITU. An instance of the BCM is created to handle each call. The BCM includes an originating process and a terminating process. Application platform 830 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for application platform 830 can be produced in specification and description language (SDL) defined in ITU-T Z.100. The SDL can be converted into C code. Additional C and C++ code can be added as required to establish the environment.

CCM 800 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 8, it can be seen that application platform 830 processes signaling information to control numerous systems and facilitate call connections and services. The SS7 signaling is exchanged with external components through signaling platform 810, and control information is exchanged with external systems through control platform 820. Advantageously, CCM 800 is not integrated into a switch CPU that is coupled to a switching matrix. Unlike an SCP, CCM 800 is capable of processing ISUP messages independently of TCAP queries.

SS7 Message Designations

SS7 messages are well known. Designations for various SS7 messages commonly are used. Those skilled in the art are familiar with the following message designations:

| | |
|---|---|
| ACM | Address Complete Message |
| ANM | Answer Message |
| BLO | Blocking |
| BLA | Blocking Acknowledgment |
| CPG | Call Progress |
| CRG | Charge Information |
| CGB | Circuit Group Blocking |
| CGBA | Circuit Group Blocking Acknowledgment |
| GRS | Circuit Group Reset |
| GRA | Circuit Group Reset Acknowledgment |
| CGU | Circuit Group Unblocking |
| CGUA | Circuit Group Unblocking Acknowledgment |
| CQM | Circuit Group Query |
| CQR | Circuit Group Query Response |
| CRM | Circuit Reservation Message |
| CRA | Circuit Reservation Acknowledgment |
| CVT | Circuit Validation Test |
| CVR | Circuit Validation Response |
| CFN | Confusion |
| COT | Continuity |
| CCR | Continuity Check Request |
| EXM | Exit Message |
| INF | Information |
| INR | Information Request |
| JAM | Initial Address |
| LPA | Loop Back Acknowledgment |
| PAM | Pass Along |
| REL | Release |
| RLC | Release Complete |
| RSC | Reset Circuit |
| RES | Resume |
| SUS | Suspend |
| UBL | Unblocking |
| UBA | Unblocking Acknowledgment |
| UCIC | Unequipped Circuit Identification Code. |

CCM Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 9:
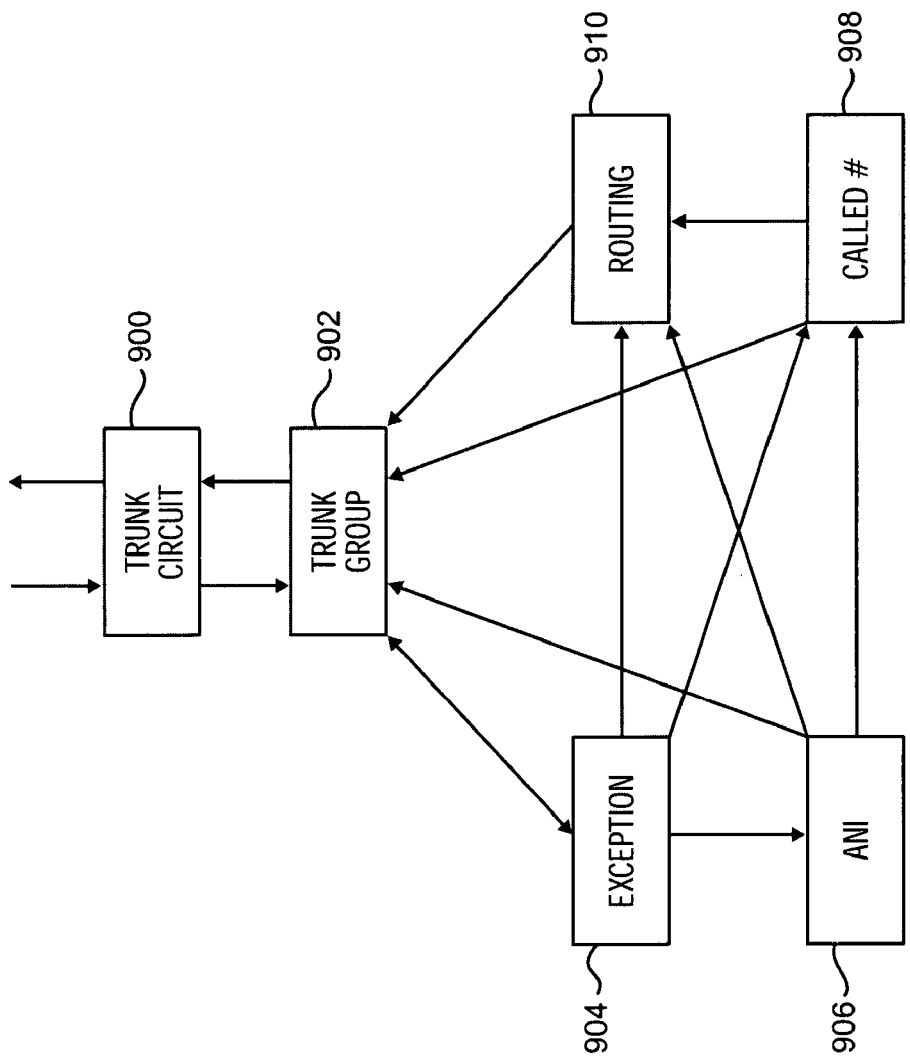
FIG. 9 is a logic diagram of a version of the present invention.

FIG. 9 depicts a data structure used by application platform 830 to execute the BCM. This is accomplished through a series of tables that point to one another in various ways. The pointers are typically comprised of next function and next index designations. The next function points to the next table, and the next index points to an entry or a range of entries in that table. The data structure has trunk circuit table 900, trunk group table 902, exception table 904, ANI table 906, called number table 908, and routing table 910.

Trunk circuit table 900 contains information related to the connections. Typically, the connections are DS0 or ATM connections. Initially, trunk circuit table 900 is used to retrieve information about the originating connection. Later, the table is used to retrieve information about the terminating connection. When the originating connection is being processed, the trunk group number in trunk circuit table 900 points to the applicable trunk group for the originating connection in trunk group table 902.

Trunk group table 902 contains information related to the originating and terminating trunk groups. When the originating connection is being processed, trunk group table 902 provides information relevant to the trunk group for the originating connection and typically points to exception table 904.

Exception table 904 is used to identify various exception conditions related to the call that may influence the routing or other handling of the call. Typically, exception table 904 points to ANI table 906. Although, exception table 904 may point directly to trunk group table 902, called number table 908, or routing table 910.

ANI table 906 is used to identify any special characteristics related to the caller's number. The caller's number is commonly known as automatic number identification (ANI). ANI table 906 typically points to called number table 908. Although, ANI table 906 may point directly to trunk group table 902 or routing table 910.

Called number table 908 is used to identify routing requirements based on the called number. This will be the case for standard telephone calls. Called number table 908 typically points to routing table 910. Although, it may point to trunk group table 902.

Routing table 910 has information relating to the routing of the call for the various connections. Routing table 910 is entered from a pointer in either exception table 904, ANI table 906, or called number table 908. Routing table 910 typically points to a trunk group in trunk group table 902.

When exception table 904, ANI table 906, called number table 908, or routing table 910 point to trunk group table 902, they effectively select the terminating trunk group. When the terminating connection is being processed, the trunk group number in trunk group table 902 points to the trunk group that contains the applicable terminating connection in trunk circuit table 902.

The terminating trunk circuit is used to extend the call. The trunk circuit is typically a VPI/VCI or a DS0. Thus it can be seen that by migrating through the tables, a terminating connection can be selected for a call.

Figure 10:
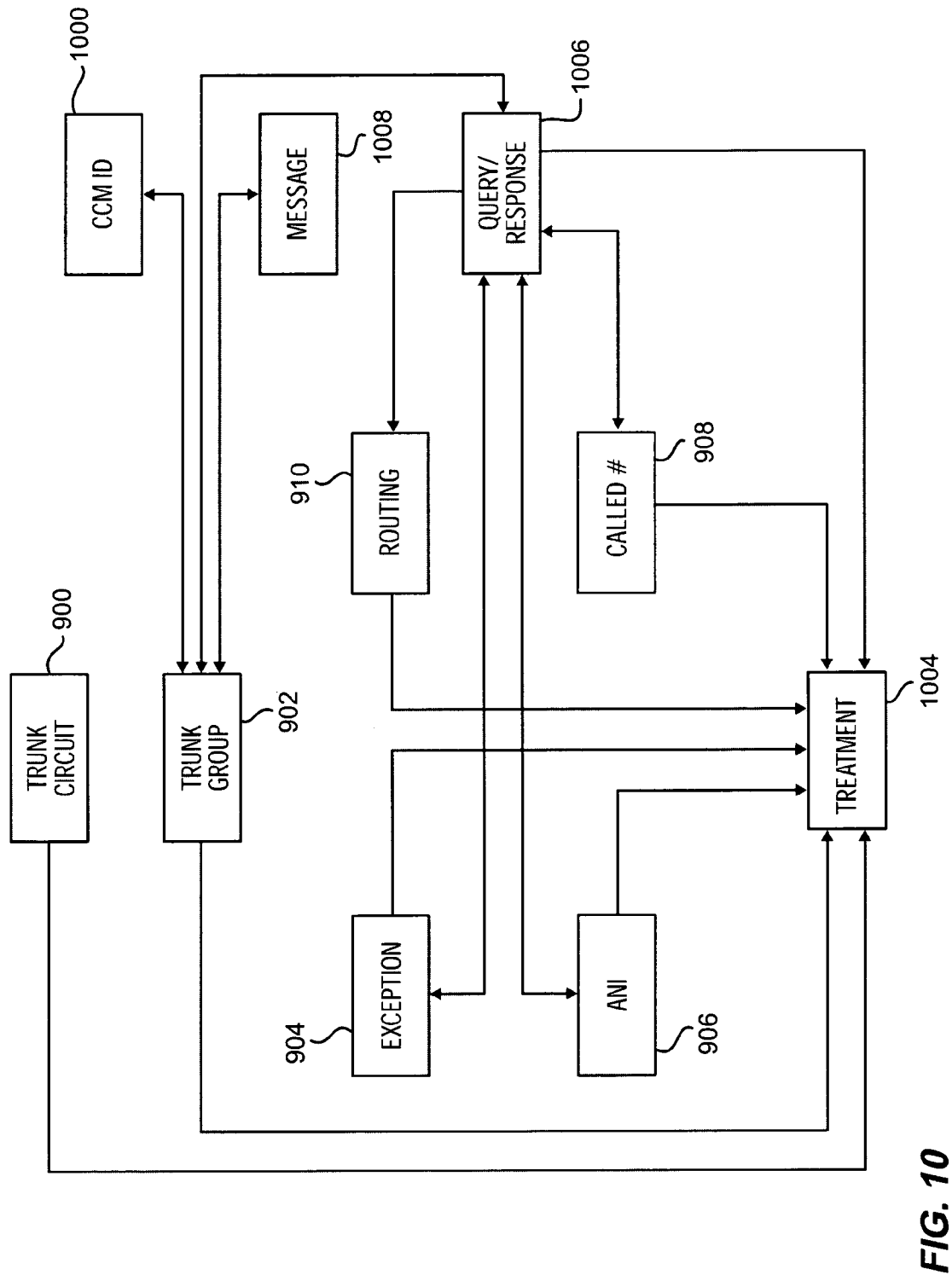
FIG. 10 is a logic diagram of a version of the present invention.

FIG. 10 is an overlay of FIG. 9. The tables from FIG. 9 are present, but for clarity, their pointers have been omitted. FIG. 10 illustrates additional tables that can be accessed from the tables of FIG. 9. These include CCM ID table 1000, treatment table 1004, query/response table 1006, and message table 1008.

CCM ID table 1000 contains various CCM SS7 point codes. It can be accessed from trunk group table 902, and it points back to trunk group table 902.

Treatment table 1004 identifies various special actions to be taken in the course of call processing. This will typically result in the transmission of a release message (REL) and a cause value. Treatment table 1004 can be accessed from trunk circuit table 900, trunk group table 902, exception table 904, ANI table 906, called number table 908, routing table 910, and query/response table 1006.

Query/response table 1006 has information used to invoke the SCF. It can be accessed by trunk group table 902, exception table 904, ANI table 906, called number table 908, and routing table 910. It points to trunk group table 902, exception table 904, ANI table 906, called number table 908, routing table 910, and treatment table 1004.

Message table 1008 is used to provide instructions for messages from the termination side of the call. It can be accessed by trunk group table 902 and points to trunk group table 902.

FIGS. 11–18 depict examples of the various tables described above. FIG. 11 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceller (EC) identification (ID) entry identifies the echo canceller for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 12 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 13 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 14 depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 15 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 9. The next function and next index point to the next table which is typically the routing table.

FIG. 16 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 11–16 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 17 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 18 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

We claim:

1. A method of operating a signaling processor for a call having a signaling message and a user communication, the method comprising:
   receiving the signaling message for the call indicating a called number;
   processing the called number to transfer a number portability query;
   receiving a number portability response indicating a route number;
   processing the route number to select an identifier for routing the user communication; and
   transferring a control message indicating the user communication and the identifier to a communication system, wherein the communication system, in response to the control message, adds the identifier to a header of the user communication and routes the user communication based on the identifier in the header.

2. The method of claim 1 wherein the signaling message comprises a signaling system seven message.

3. The method of claim 1 wherein the signaling message comprises an integrated services digital network message.

4. The method of claim 1 further comprising:
   processing the route number from the number portability response to select a connection for routing the user communication; and
   transferring another control message indicating the identifier and the connection to the communication system, wherein the communication system, in response to the other control message, routes the user communication over the connection.

5. The method of claim 1 further comprising:
   receiving another signaling message for the call indicating call termination;
   in response to the other signaling message, transferring another control message indicating the call termination to the communication system, wherein the communication system terminates the call in response to the other control message.

6. The method of claim 1 wherein the number portability query and the number portability response comprise signaling system seven messages.

7. The method of claim 1 further comprising processing the signaling message to select echo cancellation for the call.

8. The method of claim 1 wherein the identifier comprises an asynchronous transfer mode virtual identifier.

9. The method of claim 1 wherein the communication system receives the user communication over a DS0 connection.

10. The method of claim 1 wherein the signaling processor is not integrated with a switch central processing unit that is coupled to a switch matrix.

11. A signaling processor for a call having a signaling message and a user communication, the method comprising:
    an application configured to process a called number from the signaling message to generate a number portability query, process a route number from a number portability response to select an identifier for routing the user communication, and generate a control message indicating the user communication and the identifier; and
    a platform configured to receive the signaling message, transfer the number portability query, receive the number portability response, and transfer the control message to a communication system, wherein the communication system, in response to the control message, adds the identifier to a header of the user communication and routes the user communication based on the identifier in the header.

12. The signaling processor of claim 11 wherein the signaling message comprises a signaling system seven message.

13. The signaling processor of claim 11 wherein the signaling message comprises an integrated services digital network message.

14. The signaling processor of claim 11 wherein:
    the application is configured to process the route number from the number portability response to select a connection for routing the user communication and generate another control message indicating the identifier and the connection; and
    the platform is configured to transfer the other control message to the communication system, wherein the communication system, in response to the other control message, routes the user communication over the connection.

15. The signaling processor of claim 11 wherein:
the application is configured to generate another control message indicating call termination in response to another signaling message for the call indicating call termination;
the platform is configured to receive the other signaling message and transfer the other control message to the communication system, wherein the communication system terminates the call in response to the other control message.

16. The signaling processor of claim 11 wherein the number portability query and the number portability response comprise signaling system seven messages.

17. The signaling processor of claim 11 wherein the application is configured to process the signaling message to select echo cancellation for the call.

18. The signaling processor of claim 11 wherein the identifier comprises an asynchronous transfer mode virtual identifier.

19. The signaling processor of claim 11 wherein the communication system receives the user communication over a DS0 connection.

20. The signaling processor of claim 11 wherein the signaling processor is not integrated with a switch central processing unit that is coupled to a switch matrix.

* * * * *